(12) United States Patent
Wu et al.

(10) Patent No.: US 11,192,487 B2
(45) Date of Patent: Dec. 7, 2021

(54) VEHICLE REFRIGERATOR

(71) Applicants: Min Wu, Guangdong (CN); Caimao Luo, Guangdong (CN)

(72) Inventors: Min Wu, Guangdong (CN); Caimao Luo, Guangdong (CN)

(73) Assignee: WUYI University, Guangdong (CN)

( * ) Notice: Subject to any disclaimer, the term of this patent is extended or adjusted under 35 U.S.C. 154(b) by 171 days.

(21) Appl. No.: 16/389,896

(22) Filed: Apr. 19, 2019

(65) Prior Publication Data

US 2020/0317108 A1     Oct. 8, 2020

(30) Foreign Application Priority Data

Mar. 20, 2019   (CN) .......................... 201910212694.8

(51) Int. Cl.
| | |
|---|---|
| *B60N 3/10* | (2006.01) |
| *F25D 23/00* | (2006.01) |
| *F25D 11/00* | (2006.01) |
| *B60R 11/00* | (2006.01) |
| *F25B 15/04* | (2006.01) |
| *B60H 1/32* | (2006.01) |
| *F25B 15/00* | (2006.01) |
| *F25B 43/04* | (2006.01) |
| *F25B 27/00* | (2006.01) |

(52) U.S. Cl.
CPC ............ *B60N 3/104* (2013.01); *F25D 11/003* (2013.01); *F25D 23/003* (2013.01); *B60H 1/3201* (2013.01); *B60H 1/32011* (2019.05); *B60R 2011/0003* (2013.01); *F25B 15/00* (2013.01); *F25B 15/04* (2013.01); *F25B 27/007* (2013.01); *F25B 43/046* (2013.01)

(58) Field of Classification Search
CPC .............. B60H 1/3201; B60H 1/32011; F25D 2400/26; F25D 11/003; F25D 23/003; F25D 11/027; F25B 15/04; F25B 15/00; F25B 27/007; F25B 9/006; F25B 30/04; F25B 37/00; F25B 43/046; B60N 3/104; B60R 2011/0003
See application file for complete search history.

(56) References Cited

U.S. PATENT DOCUMENTS

| | | | | |
|---|---|---|---|---|
| 2,743,589 A | * | 5/1956 | Kuempel | ........... B60H 1/00207 62/243 |
| 4,765,151 A | * | 8/1988 | Bessey | ................... B60N 3/104 62/239 |
| 5,355,693 A | * | 10/1994 | McConnell | ........ B60H 1/00364 62/244 |
| 5,383,341 A | * | 1/1995 | Zur | .................... B60H 1/00007 62/476 |

(Continued)

*Primary Examiner* — Joseph F Trpisovsky
(74) *Attorney, Agent, or Firm* — Armstrong Teasdale LLP; Edward F. Behm, Jr.; Benjamin A. Ailes

(57) ABSTRACT

A vehicle refrigerator is disclosed. The vehicle refrigerator may include a body, a refrigerating system and a driving system. The refrigerating system and the driving system are both arranged in the body. The body is removable in a trunk of a vehicle. The driving system is used for driving the refrigerating system to operate normally, and may include an igniter and an air source. The igniter is connected with the air source. The refrigerating system is used for cooling an inner cavity of the body and is provided with a working medium capable of changing gas and liquid.

8 Claims, 2 Drawing Sheets

(56) References Cited

U.S. PATENT DOCUMENTS

| | | | | |
|---|---|---|---|---|
| 6,148,629 A | * | 11/2000 | Boxum | B60H 1/00364 |
| | | | | 62/239 |
| 6,318,098 B1 | * | 11/2001 | Boxum | B60H 1/00364 |
| | | | | 62/183 |
| 6,662,585 B2 | * | 12/2003 | Muller | F25B 49/04 |
| | | | | 62/236 |
| 7,055,335 B2 | * | 6/2006 | van Leeuwen | F23L 17/02 |
| | | | | 62/404 |
| 2006/0130469 A1 | * | 6/2006 | Baeuerle | B60H 1/025 |
| | | | | 60/300 |
| 2013/0047639 A1 | * | 2/2013 | Stannard | F01N 5/02 |
| | | | | 62/79 |

* cited by examiner

VEHICLE REFRIGERATOR

FIELD OF THE INVENTION

The present disclosure relates to the field of on-board appliance, and more particularly, to a vehicle refrigerator.

BACKGROUND OF THE INVENTION

Nowadays, more and more families have one or more vehicles for family service and travel. For ordinary families, sometimes it is very inconvenient to bring frozen drinks and foods for picnics, or to bring articles and medicines that need refrigeration, when there is no place for supplying refrigeration on the vehicle.

A vehicle refrigerator appears on the market to solve the problems above, and the vehicle refrigerator relies on electricity to drive. However, an engine of the vehicle cannot always run to generate electricity. Once the vehicle stalls, the vehicle's battery cannot be used to power the vehicle refrigerator. Because, when the electricity is used up, the engine cannot be started, and the vehicle refrigerator cannot work continuously.

SUMMARY OF THE INVENTION

The present disclosure is intended to solve at least one of the technical problems existing in the prior art and provide a vehicle refrigerator capable of working continuously.

According to the first aspect of the present disclosure, a vehicle refrigerator is provided, which comprises a body, a refrigerating system and a driving system; the refrigerating system and the driving system are both arranged in the body; the body is detachably installed in a trunk of a vehicle; the driving system is used for driving the refrigerating system to operate normally and comprises an igniter, an air course and an air source, and the igniter is connected with the air source through the air course; and the refrigerating system is used for cooling an inner cavity of the body and is provided with a working medium capable of changing in gas and liquid.

Beneficial effects: the igniter is supplied separately to enable the igniter to provide energy for the working medium in the refrigerating system, so that the working medium moves in the refrigerating system and changes in gas and liquid, thus reducing a temperature in the body without the need for energy of the vehicle. Under the condition that the vehicle stops running, the refrigerator can still be supplied with power to ensure the continuous operation of the refrigerator.

According to the vehicle refrigerator described in the first aspect of the present disclosure, the refrigerating system comprises a generator, a condenser, an evaporator, a heat exchanger and an absorber; the generator, the condenser, the evaporator and the absorber are sequentially communicated to form a refrigerating loop; and the heat exchanger is respectively communicated with the generator, the evaporator and the absorber, and the igniter is used for heating the working medium in the generator.

It shall be mentioned that the working medium comprises a mixture of ammonia, water and hydrogen, the ammonia is distilled out when ammonia water in the generator is heated by the igniter and enters the condenser along with a pipeline to be liquefied, liquefied liquid ammonia enters the evaporator to be mixed with the hydrogen, an air pressure is reduced and a boiling point is reduced, so that the liquid ammonia is vaporized to absorb heat, and heat in the body is taken away, and the ammonia gas and the water are mixed again and flow into the generator for circulation, so as to achieve the effect of continuously reducing a temperature of the body.

According to the vehicle refrigerator described in an aspect of the present disclosure, the air course between the igniter and the air source is provided with an electromagnetic valve, the electromagnetic valve is electrically connected with a piezoresistive sensor and a second power supply, the piezoresistive sensor keeps normally closed, and the electromagnetic valve keeps an access in an energized state. When a vehicle encounters an accidental collision, the piezoresistive sensor is disconnected, so that the electromagnetic valve is closed and the air source is blocked, a first igniter loses the supply of combustible gas, thus gradually extinguishing the flame and preventing the occurrence of a secondary accident.

According to the vehicle refrigerator described in the first aspect of the present disclosure, the body is provided with a storage cavity, a first interlayer and a second interlayer, the condenser, the heat exchanger and the absorber are all arranged in the first interlayer, the evaporator is arranged in the storage cavity, and the generator and the driving system are arranged in the second interlayer. The driving system is separated from the refrigerating system to prevent the heat from affecting the normal work of other parts, and meanwhile, the evaporator is arranged in the storage cavity to better cool the storage cavity.

According to the vehicle refrigerator described in an aspect of the present disclosure, a bottom of the second interlayer is provided with an intake pipe and a smoke vent, the trunk is internally provided with a pipeline communicated with the intake pipe, the pipeline is communicated with an external environment, a chimney is wrapped outside the igniter, the chimney is communicated with the smoke vent and the intake pipe, a bottom of the trunk is provided with an exit pipe communicated with the outside, and the exit pipe is communicated with the smoke vent.

It shall be mentioned that the pipeline is internally provided with an exhaust fan, the exhaust fan brings oxygen into the igniter for combustion, and the smoke generated after combustion is discharged out of the vehicle through the chimney—the smoke vent—the exit pipe.

According to the vehicle refrigerator described in an aspect of the present disclosure, the exit pipe is communicated with a tail pipe. The exit pipe is communicated with the tail pipe, so that the smoke and tail gas of the vehicle may be discharged into the environment together, and centralized treatment is convenient.

According to the vehicle refrigerator described in an aspect of the present disclosure, the igniter is wrapped with a mesh enclosure, and the mesh enclosure is arranged between the chimney and the igniter. The mesh enclosure can further prevent heat diffusion from affecting the normal work of other parts.

BRIEF DESCRIPTION OF THE DRAWINGS

The present disclosure is further described hereinafter with reference to the drawings and the embodiments.

DETAILED DESCRIPTION OF THE EMBODIMENTS

Figure 1:
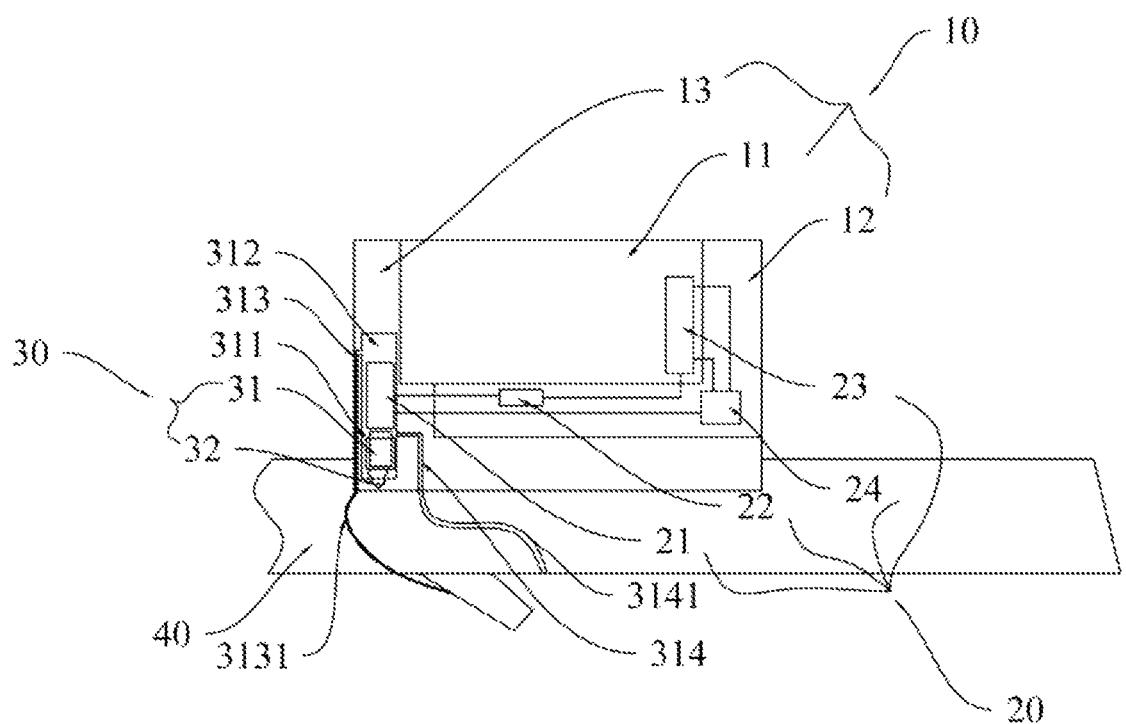
FIG. 1 is a structure diagram of the embodiment of the present disclosure.

The detailed embodiments of the present disclosure will be described in this part. The preferred embodiments of the present disclosure are shown in the drawings that are intended to supplement the description in the written part of the description with graphics, so that people can intuitively and vividly understand each technical feature and the overall technical solution of the present disclosure, but the drawings cannot be understood as limiting the protection scope of the present disclosure.

In the description of the present disclosure, it shall be understood that the orientations or position relations related to orientation descriptions, such as the orientations or position relations indicated by upper, lower, front, rear, left, right, etc. are based on the orientations or position relations shown in the drawings, which are only for descripting the present disclosure conveniently and simplifying the description, rather than indicating or implying that the devices or elements indicated must have a specific orientation, and be constructed and operated in a specific orientation, and thus cannot be understood as limiting the present disclosure.

In the description of the present disclosure, the meaning of several means one or more, and the meaning of multiple means more than two. The meanings of greater than, less than, more than, etc. are understood as not including this number, while the meanings of above, below, within, etc. are understood as including this number. If it is described that the first and second are only used for the purpose of distinguishing the technical features, then they cannot be understood as indicating or implying relative importance, implicitly indicating the number of the indicated technical features or implicitly indicating the order of the indicated technical features.

In the description of the present disclosure, unless otherwise clearly defined, words such as setting, installation, connection, etc. shall be understood broadly, and those skilled in the art can reasonably determine the specific meanings of the above words in the present disclosure in combination with the specific contents of the technical solution.

With reference to FIG. 1, according to the first aspect of the present disclosure, a vehicle refrigerator is provided, which comprises a body 10, a refrigerating system 20 and a driving system 30. The refrigerating system 20 and the driving system 30 are both arranged in the body. The body 10 is removable in a trunk 40 of a vehicle. The driving system 30 used for driving the refrigerating system 20 to operate normally comprises an igniter 31, an air course and an air source 32. The igniter 31 is connected with the air source 32 through the air course. The refrigerating system 20 is used for cooling an inner cavity of the body 10 and is provided with a working medium capable of changing in gas and liquid.

In an actual work process, the igniter 31 is supplied separately to enable the igniter 31 to provide energy for the working medium in the refrigerating system 20, so that the working medium moves in the refrigerating system 20 and changes in gas and liquid, thus reducing a temperature in the body 10 without the need for energy of the vehicle. Under the condition that the vehicle stops running, the refrigerator can still be supplied with power to ensure the continuous operation of the refrigerator.

Figure 2:
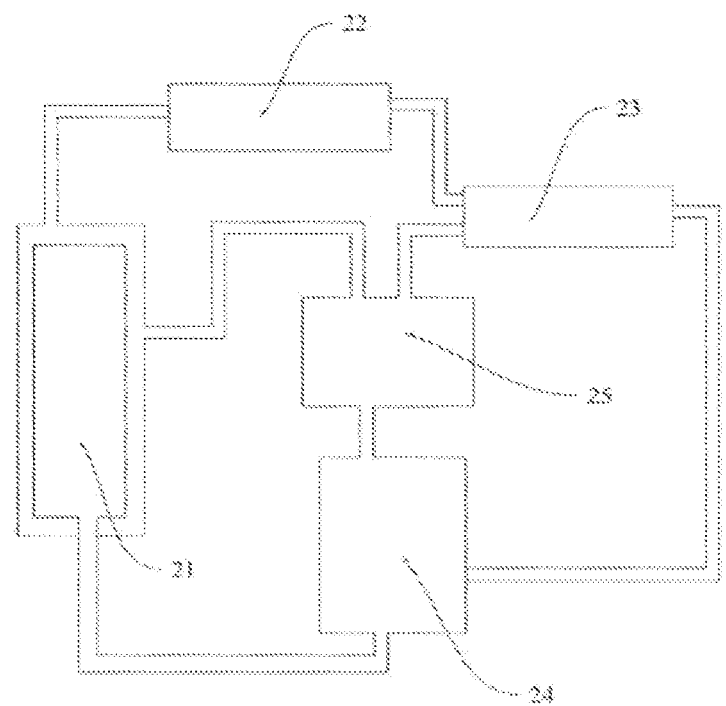
FIG. 2 is a structure diagram of a refrigerating system in the embodiment of the present disclosure.

With reference to FIG. 2, in some embodiments, the refrigerating system 20 comprises a generator 21, a condenser 22, an evaporator 23, a heat exchanger 25 and an absorber 24. The generator 21, the condenser 22, the evaporator 23 and the absorber 24 are sequentially communicated, so as to form a refrigerating loop. The heat exchanger 25 is respectively communicated with the generator 21, the evaporator 23 and the absorber 24. The igniter 31 is used for heating the working medium in the generator 21.

It shall be mentioned that the working medium comprises a mixture of ammonia, water and hydrogen. The ammonia is distilled out when ammonia water in the generator 21 is heated by the igniter 31 and enters the condenser 22 along with a pipeline 3141 to be liquefied. The liquefied liquid ammonia enters the evaporator 23 to be mixed with the hydrogen, an air pressure is reduced and a boiling point is reduced, so that the liquid ammonia is vaporized to absorb heat, and heat in the body 10 is taken away. The ammonia gas and the water are mixed again and flow into the generator 21 for circulation, so as to achieve the effect of continuously reducing the temperature in the body 10.

In a circulation process, when the ammonia gas enters the condenser 22 from the generator 21, a concentration of the ammonia water is decreased, the liquid will enter the absorber 24 to wait for the ammonia gas flowing into the absorber 24 from the evaporator 23 and dissolve the ammonia gas again to form concentrated ammonia water, which will return to the generator 21, the heat exchanger 25 is arranged between an emitter and the absorber 24 to preheat the liquid in the absorber 24, and after the preheated concentrated ammonia water enters the generator 21, a heating time can be reduced and a reaction speed can be increased.

On the other hand, since hydrogen gas is insoluble in water, the hydrogen gas re-enters the evaporator 23 and passes through heat exchange by the heat exchanger 25 before entering the evaporator 23, so as to cool the hot hydrogen gas and reduce the effect on the cooling effect of the evaporator 23.

Figure 3:
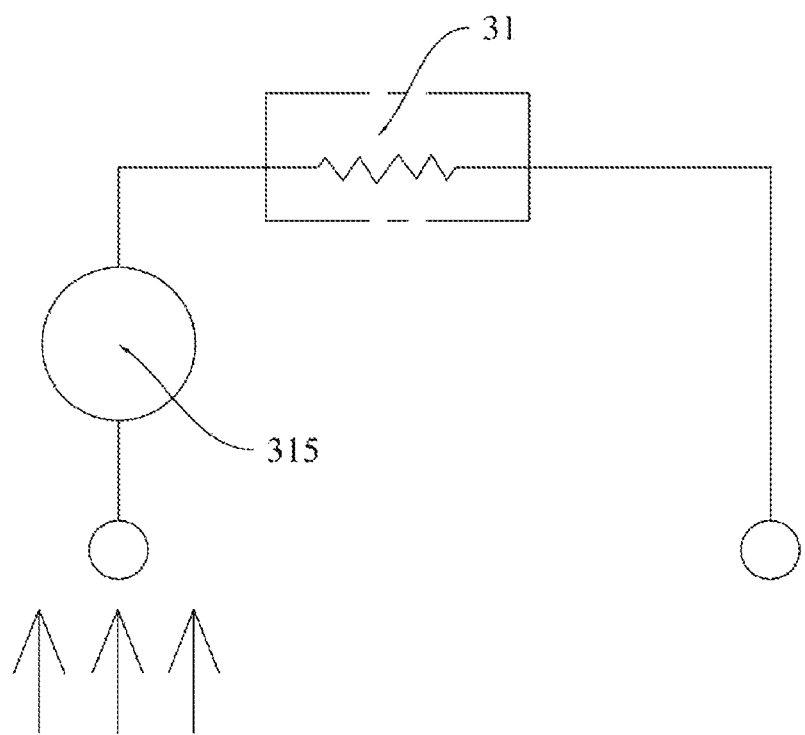
FIG. 3 is a structure diagram of a driving system in the embodiment of the present disclosure.

With reference to FIG. 3, according to the vehicle refrigerator described in the first aspect of the present disclosure, the air course between the igniter 31 and the air source 32 is provided with an electromagnetic valve 315, the electromagnetic valve 315 is electrically connected with a piezoresistive sensor 316 and a second power supply, the piezoresistive sensor 316 keeps normally closed, and the electromagnetic valve 315 keeps an access in an energized state.

Figure 4:
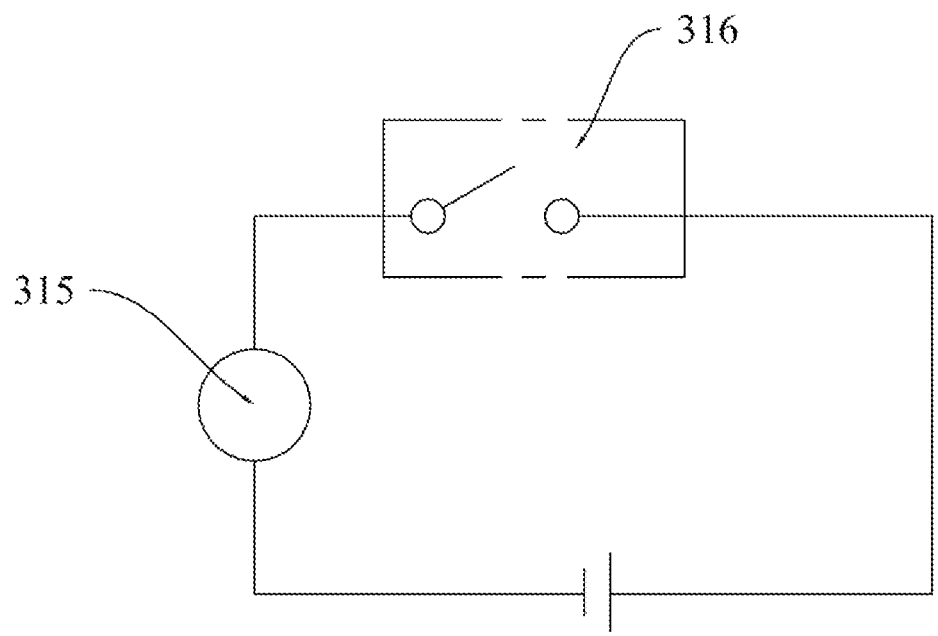
FIG. 4 is a structure diagram of a circuit of an electromagnetic valve, a second power supply and a piezoresistive sensor in the embodiment of the present disclosure.

In an actual use process, when the vehicle encounters an accidental collision, if combustible gas is continuously supplied to the igniter 31, secondary injury is likely to be caused by explosion. With reference to FIG. 4, when the vehicle encounters a collision, the piezoresistive sensor 316 is turned off, so that the electromagnetic valve 315 is closed, and the air source 32 is blocked, and a first igniter 31 loses the supply of combustible gas, thus gradually extinguishing the flame and preventing the occurrence of a secondary accident. Preferably, the combustible gas may be natural gas or liquefied petroleum gas.

According to the vehicle refrigerator described in an aspect of the present disclosure, the body 10 is provided with a storage cavity 11, a first interlayer 12 and a second interlayer 13. The condenser 22, the heat exchanger 25 and the absorber 24 are all arranged in the first interlayer 12. the evaporator 23 is arranged in the storage cavity 11, and the generator 21 and the driving system 30 are arranged in the second interlayer 13. The driving system 30 is separated from the refrigerating system 20 to prevent the heat from affecting the normal work of other parts, and meanwhile, the evaporator 23 is arranged in the storage cavity 11 to better cool the storage cavity 11.

According to the vehicle refrigerator described in an aspect of the present disclosure, the second interlayer 13 is provided with an intake pipe 314 and a smoke vent 313 at the bottom, the trunk is internally provided with a pipeline 3141 communicated with the intake pipe 314, the pipeline 3141 is communicated with an external environment, a chimney 312 is wrapped outside the igniter 31, the chimney 312 is communicated with the smoke vent 313 and the intake pipe 314. The trunk is provided with an exit pipe 3131 communicated with the outside at the bottom, and the exit pipe 3131 is communicated with the smoke vent 313.

Preferably, an air hole of the intake pipe 314 is located at a position lower than that of the smoke vent 313, and since oxygen is heavier than carbon dioxide, when the oxygen enters the chimney 312, smoke discharging can be promoted.

It shall be mentioned that the pipeline 3141 is internally provided with an exhaust fan, the exhaust fan brings oxygen into the igniter 31 for combustion, and the smoke generated after combustion is discharged out of the vehicle through the chimney 312—the smoke vent 313—the exit pipe 3131.

According to the vehicle refrigerator described in an aspect of the present disclosure, the exit pipe 3131 is communicated with a tail pipe. The exit pipe 3131 is communicated with the tail pipe, so that the smoke and tail gas of the vehicle may be discharged into the environment together, and centralized treatment is convenient.

According to the vehicle refrigerator described in an aspect of the present disclosure, the igniter 31 is wrapped with a mesh enclosure 311, and the mesh enclosure 311 is arranged between the chimney 312 and the igniter 31. The mesh enclosure 311 can further prevent heat diffusion from affecting the normal work of other parts.

The embodiments of the present disclosure are described in detail above with reference to the drawings, but the present disclosure is not limited to the embodiments above, and various changes can be made within the scope of knowledge possessed by those of ordinary skills in the technical field without departing from the purpose of the present disclosure.

The invention claimed is:

1. A vehicle refrigerator, comprising
a body removable in a trunk of a vehicle,
a refrigerating system arranged in the body for cooling an inner cavity of the body, and
a driving system for driving the refrigerating system to operate normally,
wherein the driving system comprises an air source, and an igniter connected with the air source;
wherein the refrigerating system is provided with a working medium capable of changing in gas and liquid; and
wherein an electromagnetic valve is provided between the igniter and the air source; the electromagnetic valve is electrically connected with a piezoresistive sensor and a second power supply; the piezoresistive sensor keeps normally closed; and the electromagnetic valve keeps an access in an energized state.

2. The vehicle refrigerator according to claim 1, wherein: the refrigerating system comprises a generator, a condenser, an evaporator, a heat exchanger and an absorber; the generator, the condenser, the evaporator and the absorber are sequentially communicated to form a refrigerating loop; the heat exchanger is respectively communicated with the generator, the evaporator and the absorber; and the igniter is used for heating the working medium in the generator.

3. The vehicle refrigerator according to claim 2, wherein: the body is provided with a storage cavity, a first interlayer and a second interlayer; the condenser the heat exchanger and the absorber are all arranged in the first interlayer, the evaporator is arranged in the storage cavity; and the generator and the driving system are arranged in the second interlayer.

4. The vehicle refrigerator according to claim 3, wherein: the second interlayer is provided with an intake pipe and a smoke vent at the bottom; the trunk is internally provided with a pipeline communicated with the intake pipe; the pipeline is communicated with an external environment, a chimney is wrapped outside the igniter; the chimney is communicated with the smoke vent and the intake pipe; the trunk is provided with an exit pipe communicated with the outside at the bottom; and the exit pipe is communicated with the smoke vent.

5. The vehicle refrigerator according to claim 4 wherein the exit pipe is communicated with a tail pipe.

6. The vehicle refrigerator according to claim 4, wherein the igniter is wrapped with a mesh enclosure, and the mesh enclosure is arranged between the chimney and the igniter.

7. The vehicle refrigerator according to claim 5, wherein the igniter is wrapped with a mesh enclosure, and the mesh enclosure is arranged between the chimney and the igniter.

8. A vehicle refrigerator, comprising
a body removable in a trunk of a vehicle,
a refrigerating system arranged in the body for cooling an inner cavity of the body, and
a driving system for driving the refrigerating system to operate normally,
wherein the driving system comprises an air source, and an igniter connected with the air source;
wherein the refrigerating system is provided with a working medium capable of changing in gas and liquid;
wherein the refrigerating system comprises a generator, a condenser, an evaporator, a heat exchanger and an absorber; the generator, the condenser, the evaporator and the absorber are sequentially communicated to form a refrigerating loop; the heat exchanger is respectively communicated with the generator, the evaporator and the absorber; and the igniter is used for heating the working medium in the generator; and
wherein an electromagnetic valve is provided between the igniter and the air source; the electromagnetic valve is electrically connected with a piezoresistive sensor and a second power supply; the piezoresistive sensor keeps normally closed; and the electromagnetic valve keeps an access in an energized state.

* * * * *